(12) United States Patent
Kenyon

(10) Patent No.: US 6,370,542 B1
(45) Date of Patent: Apr. 9, 2002

(54) METHOD AND APPARATUS FOR KNOWLEDGE ACQUISITION AND MANAGEMENT

(75) Inventor: Jeffrey D. Kenyon, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/178,357

(22) Filed: Oct. 23, 1998

(51) Int. Cl.[7] ............................................... G06F 17/30
(52) U.S. Cl. ........................... 707/104; 707/6; 707/103
(58) Field of Search ............................... 707/3, 6, 103, 707/104; 717/2–3, 4, 10; 705/10; 706/45, 46, 60; 434/362; 345/331

(56) References Cited

U.S. PATENT DOCUMENTS

| | | | |
|---|---|---|---|
| 4,943,932 A | * | 7/1990 | Lark et al. ..................... 706/60 |
| 5,084,813 A | * | 1/1992 | Ono ................................ 717/3 |
| 5,307,446 A | | 4/1994 | Araki et al. .................... 706/59 |
| 5,412,758 A | | 5/1995 | Srikanth et al. ............... 706/59 |
| 5,487,135 A | | 1/1996 | Freeman ....................... 706/59 |
| 5,504,840 A | | 4/1996 | Hiji et al. ...................... 706/61 |
| 5,515,491 A | * | 5/1996 | Bates et al. ................... 345/331 |
| 5,615,112 A | * | 3/1997 | Liu Sheng et al. ......... 707/104 |
| 5,767,848 A | * | 6/1998 | Matsuzaki et al. .......... 345/331 |
| 6,202,043 B1 | * | 3/2001 | Devoino et al. .............. 709/13 |

FOREIGN PATENT DOCUMENTS

WO  WO 00/13080  * 3/2000  ............. G06F/3/14

OTHER PUBLICATIONS

IEEE publication, "Determining the Benefit of Knowledge Management Activities" by Tim Kotnour Ph.D. et al., Industrial Engineering and Management Systems, University of Central Florida, Orlando, Florida, pp. 94–99, Jan. 1997.*

(List continued on next page.)

Primary Examiner—Diane D. Mizrahi
(74) Attorney, Agent, or Firm—Marsh Fischmann & Breyfogle

(57) ABSTRACT

A system and method provided for the acquisition and retention of knowledge assets. The system includes a user interface, a processor, and memory storage devices. In order to use the system, system users perform different tasks. Initiators and knowledge stewards provide for the generation and monitoring of specifications which describe in detail performance issues which have been encountered. These issues are stored in a database and common issues are linked together. Implementors retrieve the specifications and implementation plans to resolve performance issues. These implementation plans are also stored in the database and are accessible by the initiator and the knowledge steward who may provide an assessment of the success of the implementation plan. The structure of the database is such that links may be established between specification and implementation plans with common subject matter. A vocabulary is provided for use in creating specifications and implementation plans to make the database easily searchable.

14 Claims, 6 Drawing Sheets

OTHER PUBLICATIONS

Internet publication, "A Concept for an Internet–based Process–oriented Knowledge Management Environment" by Frank Maurer, Department of Computer Science, University of Calgary, Calgary Alberta T2N 1N4, Canada, pp. 1–22; http://spuds.cpsc.ucalgary.ca/KAW/, Oct. 2000.*

Internet publication, "A Process for Knowledge Acquistion and Management" by Jeffrey D. Kenyon, US West Information Technologies, Inc. Denver, CO, Proceedings of KAW'98, Eleventh Workshop on Knowledge Acquisition, Modeling and Management, Banff, Alberta, pp. 1–17, Apr. 1998.*

IEEE publication, "Enterprise Knowledge Management" by, Daniel O'Leary, University of Southern California, Computer, pp. 54–61. http://spuds.cpsc.ucalgary.ca/KAW/KAW98/maurer/, Mar. 1998.*

U. Roy et al. paper entitled, "Product Develpment in a Collaborative Design Environment", Knowledge Based Engin. Lab., Dept. of Mech., Aerospace and Manuf. Engin., Syracuse, NY. vol. 5, No. 4, Technomic Publishing, Co. pp. 347–364.*

* cited by examiner

METHOD AND APPARATUS FOR KNOWLEDGE ACQUISITION AND MANAGEMENT

FIELD OF THE INVENTION

The invention described herein relates to the management of knowledge assets and more specifically to the acquisition, retention, management of knowledge assets for use in a variety of applications.

BACKGROUND OF THE INVENTION

In the development of products or technologies which require significant engineering input, many companies will assign engineers or technologists to a particular task for a finite amount of time. A typical product or technology goes through three stages. The first stage is design and development. During this stage engineers and technologists design and then build a prototype. The second stage is testing. During this stage the prototype is tested to determine its performance and reliability. In the third stage, the product or technology is in its final form and is released to its final user to operate as it was designed. During all three stages problems in design or performance issues may be encountered which require that the engineers or technologists develop solutions.

In the past, when the engineers or technologists developed solutions to various design or performance problems, the solutions or other pertinent information may not have been recorded or memorialized is such a way that the information may be useful to those who do not have the same depth of knowledge in a particular area. For example, many engineers or technologists keep engineering lab notebooks which track design and development as well as the various problems encountered. These laboratory notebooks are usually just one person's record of the design and development, written in the person's own style, and noting only the things that he or she finds significant.

SUMMARY OF THE INVENTION

Therefore, one object of the present invention is to provide a method and system for recording and organizing knowledge assets acquired during the design, testing, and use of a product or technology.

Another object is to organize the knowledge assets in such a way that they are easily accessible.

The inventor has recognized that the knowledge created during the design, development, testing, and implementation of a product or technology may be useful to those who use the product and technology, or to others who encounter similar problems in related technologies. The inventor has disclosed a process and apparatus to acquire knowledge during a project life cycle and then store it in a fashion such that it is easily accessible. The information gained provides visibility into the design and development process, as well as ample feedback loops to ensure that the real world need is met by an implemented knowledge solution. The solution would mandate use of an intermediate, structured text-based representation that allows inexperienced users to specify knowledge at an appropriate level of detail, while offering opportunities to generate technology-specific implementations of knowledge forms. The data structure, being technology-dependent, offers both flexibility and new opportunities for knowledge reuse.

The system disclosed herein may be employed through use of a data network which provides a connection between at least one user interface and at least one memory storage device. This connection is established through a processor such as a network server. A memory device is also included which stores a vocabulary, or ontology, for use in creating specifications which describe problems to be solved, and implementation plans which describe the solutions. In one aspect of the invention, the system may also be implemented on a smaller scale, in a device such as a personal computer with sufficiently large memory.

In order to perform the process of identifying and storing knowledge assets, the input of a number of parties is required. The entire process is initiated by the creation of a specification that describes the knowledge asset to be represented. The information to be included in the specification may be dependent upon the types of information that make up the knowledge asset. The specification may be generated by an initiator who identifies the problem to be solved or by a knowledge steward working proactively to identify new knowledge for the system. After the concept is defined in sufficient detail, the specification may then be provided to the knowledge steward.

The knowledge steward then assesses whether the knowledge is new or whether it represents a useful change or extension to the existing knowledge base. This determination may be made through an automated search through the database for relevant terms. The criteria may also include scope of the knowledge where the knowledge steward judges whether the knowledge falls within the organization's scope of responsibilities. For example, a procedure on how to adjust a chair might be useful, but its position with regard to the organization's scope is debatable. If the knowledge asset is not otherwise identified in the database, the knowledge steward may then hand off the knowledge specification for implementation.

The implementor, using the specification, creates a plan for representing the knowledge in one or more of the technologies available. Upon completion, the plan is provided to both the initiator and the knowledge steward for review. The knowledge steward ensures that the implemented knowledge conforms to the specification. The initiator also ensures that the implemented knowledge satisfies the need in the real world. If the initiator is not satisfied with the outcome, specific problems are identified and brought to the attention of the knowledge steward and/or the implementor to resolve those problems.

In another aspect of the invention, the specification and implementation plans created by the parties are stored in the database. When creating either of these documents the parties may employ terms included in the vocabulary. Using common terms provides for easier searches of the database when the documents are created. When storing the specifications and implementation plans in the database a link is created between documents of common or similar technology. The links allow a party who is searching to find all specifications and implementation plans relevant to a particular technology.

In yet another aspect of the invention, a screen display is provided to a system user through the interface for creating the specifications and implementation plans. Various pull-down menus and designated areas are provided in the display for the entry and editing of information stored in the database.

Numerous modifications and additions will be apparent to those skilled in the art upon further consideration of the invention.

DESCRIPTION OF THE PREFERRED EMBODIMENTS

Figure 1:
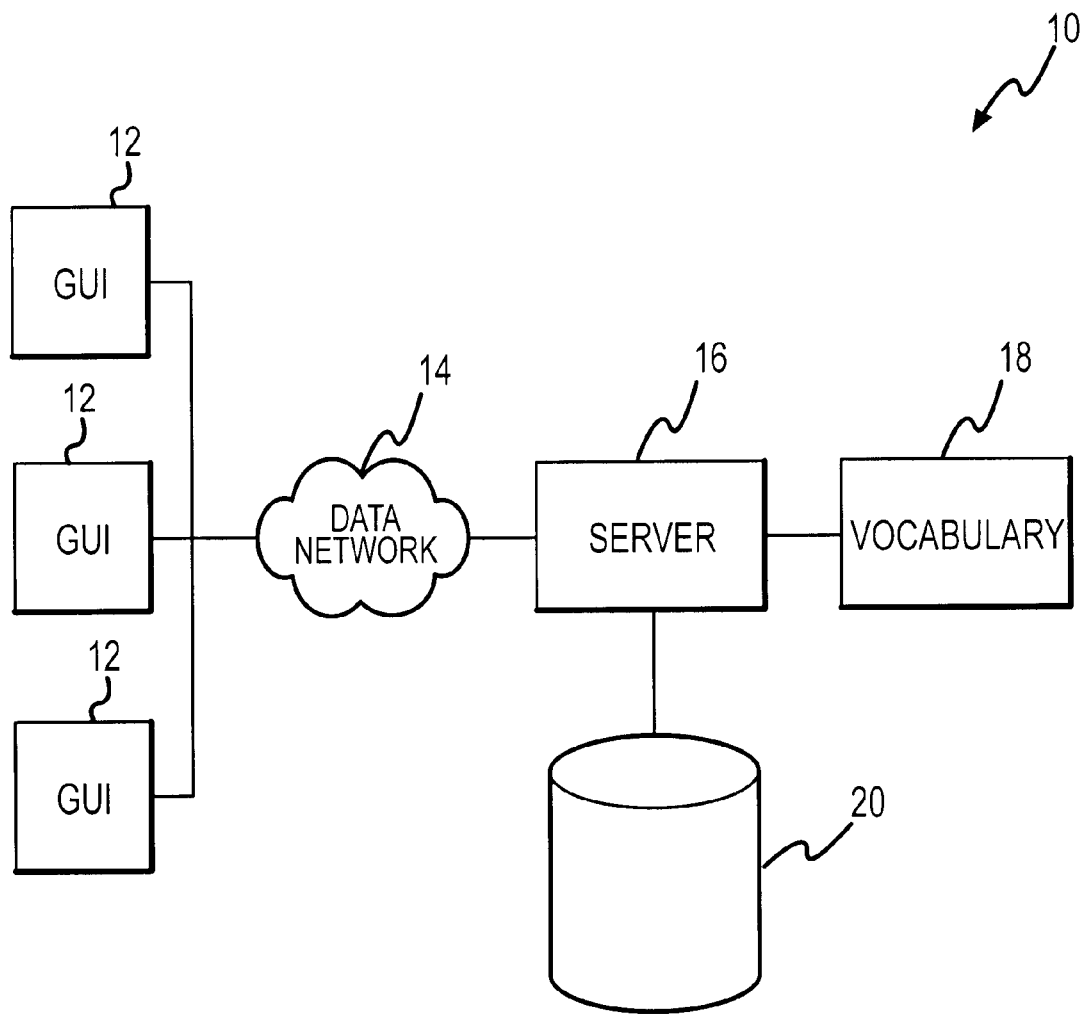
FIG. 1 discloses a system diagram including the user interface, the server and database.

Disclosed in FIG. 1 is a system diagram for an embodiment of the invention. This system provides the capability for a single or multiple users to acquire and store knowledge assets in a manner such that they are easily accessible. The system may be accessed through a graphical user interface 12 which is in electrical connection with a data network 14. The user interfaces may be personal computers with the capability to connect to a network. The data network may be a local area network (LAN) with a finite number of users or a data network such as World Wide Web through which the system users may connect with a remotely located server 16. In the system described herein, the server 16 is in connection with two different memory devices. Database 20 provides the functionality for the system users to store and access information. Any number of commercially available databases may work within the system. The information which is stored and retrieved from this database will be described in greater detail below. Memory device 18 contains a listing of the vocabulary, or ontology, which is to be employed by the system users when generating information to be stored in the database. The information in this memory device can be accessed and viewed through the GUI'S.

Although the applicant has shown a large scale information system in FIG. 1 which incorporates multiple user interfaces, a data network, as well as a server and databases, one skilled in the art would realize that the system described herein may be implemented on a smaller scale. In particular, the steps of the invention may be performed on a personal computer which has a hard drive with the capacity to store a significant amount of data on and a processor and operating system which can run a number of executable programs.

Figure 2:
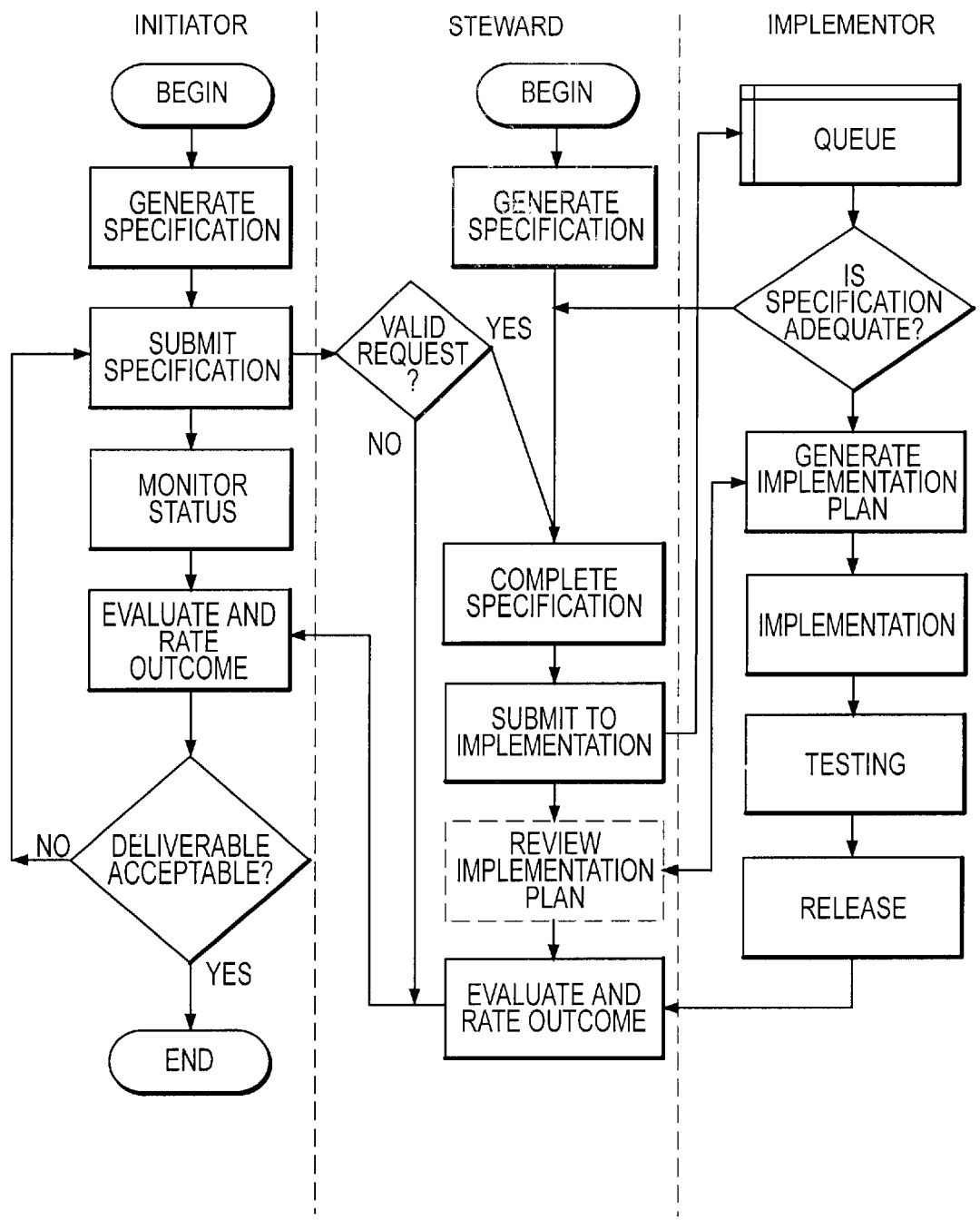
FIG. 2 discloses a flow chart which describes the steps performed by different parties in the process.

Disclosed in FIG. 2 is a flow chart which provides a general description of the duties performed by different parties who use the method and system described herein to create and access data assets. In the process described herein, there are three areas of responsibility. Multiple individuals may act in each role and conversely, one individual may act in multiple roles. The roles are: the "initiator," who serves as the owner of the knowledge concept to be presented. The identification of knowledge may be reactive (e.g., in response to an alarm or failure), or it may be proactive (e.g., as a result of analyzing log files, and attempting to devise an automated approach to the most common problems).

The "knowledge steward" acts as a gatekeeper for the knowledge. The knowledge steward is responsible for determining whether the knowledge is new, redundant, or a modification/upgrade/extension of existing knowledge, and completing the specification of what needs to be added to the system. The knowledge steward is also responsible for re-examining the process on a regular basis, identifying and building in support for new knowledge types, and ensuring that the process is working successfully. The knowledge steward serves as the "day-to-day" process owner.

The "implementor" is responsible for taking a completed specification describing the problem to be solved and generating and implementing a plan for representing that knowledge, using the set of technology options available. The implementation plan is provided to the initiator and the knowledge steward who then review the plan, and if possible, provide for the implementation.

The term "concept" is meant to include any knowledge which may be useful to an organization. The most common forms for knowledge in most organizations are in documentation (printed or on-line), computer code, and in the minds of employees. Some examples of the knowledge concepts are: alarm/event information and the associated failures which cause them, procedures, problem/resolution description (which may be constructed out of multiple alarms, failures and procedures), and rules (e.g., ignore all events of type x, machine y and time window z; they are caused by routine maintenance procedures). The knowledge concept should be a specific example of some type of knowledge other than general suggestions with no specific examples. If the concept is inadequately specified, it will be up to the knowledge steward to work with the initiator to develop their concept into something that can be implemented.

The flow charts in FIG. 2 describe the roles and interactions by participants in the process. The entire process is initiated by the creation of a specification that describes the knowledge concept to be represented. The information to be included in the specification is dependent upon the types of information that make up the knowledge concepts. The specification may be generated by the initiator or by a knowledge steward working proactively to identify new knowledge for the system. After the concept is defined in sufficient detail, the specification is then handed off to the knowledge steward. If the concept was initiated by the knowledge steward, this step is omitted. Should the process be supported by a trouble ticketing system, or another system automating the process flow, this step in the process would be the forwarding of the ticket to the steward or the act of specification generation itself.

The criteria for whether a knowledge concept should be further developed may include uniqueness. The knowledge steward must also assess whether the knowledge is new or whether it represents a useful change or extension to the existing knowledge base. This determination can be made by the knowledge steward through an automated search through the database for relevant terms. The criteria may also include scope of the knowledge where the knowledge steward judges whether the knowledge falls within the organization's scope of responsibilities. For example, a procedure on how to adjust a chair might be useful, but its position with regard to the organization's scope is debatable.

Finally, utility relates to whether if knowledge, even if accurate, is useful. The knowledge steward must assess the relationship between the cost to represent the knowledge (from both implementation and maintenance perspectives) versus the potential benefit of that knowledge. For example, representing knowledge relating to an application due to be phased out in three to six months is seldom a worthwhile investment.

The knowledge steward is responsible for adding sufficient detail to the concept so that it can be handed off for implementation. The specification must illustrate how the new knowledge is to be integrated into the existing knowledge structures, or alternatively, show how the existing structures are to be modified or replaced. As part of completing the specification, information may be gathered to objectively assess the value of the knowledge. Potential data points for this task may include such things as number of customers impacted, quality of customer impact, impact to on-line commitment, impact to production cycle, availability of work around, revenue impact, impact to system response time, and impact to functionality. For each of the above data points, points should be assigned according to the perceived impact of these issues. As a result, each knowledge concept will have its own unique score.

Once the steward has the knowledge concept described in sufficient detail, the specification is then handed off for implementation. Should the process be supported by a trouble ticketing system, or another system-automating process flow, this step in the process would simply be the forwarding of the ticket to the implementor, or the completion of the specification itself. The implementor, if unable to generate an implementation plan from the specification, may choose to reject the specification, returning the specification to the steward and requesting elaboration on the specific points.

The implementor, using the specification, creates a plan for representing the knowledge in one or more of the technologies available. The plan is placed in a location accessible to both the initiator and the knowledge steward for review. Should the process be supported by a trouble ticketing system, or another system-automating process flow, this step in the process should be the completion of the implementation plan (and automatic availability for review). The implementor, using the plan and any subsequent feedback from the initiator or the knowledge steward, represents the knowledge according to the plan.

Following implementation, but prior to release, the implementor ensures that the implementation of the knowledge conforms to the plan through testing. The implementor then makes the knowledge available to the community, and then the knowledge steward ensures that the implemented knowledge conforms to the specification. The initiator also ensures that the implemented knowledge satisfies the need in the real world. If the initiator is not satisfied with the outcome, they are obligated to identify specific problems and work with the knowledge steward and/or the implementor to resolve those problems.

The output of the process is delivery of formalized knowledge asset that meets the needs of the individual who originally instigated its creation, as well as the organizations's needs. The characteristics of the deliverables include a knowledge asset in a form which is easily transferrable, as well as in a form that encourages reuse.

When the initiator is generating a specification, it is desirable that common terms be used for the description. These common terms should also be employed by the knowledge steward when formalizing the specification, and by the initiator in the solution which is created. All of these terms can be included in a special database. An ontology is a formal specification of the vocabulary to be used in describing knowledge assets. It may be thought of as a network of objects, each of which has attributes or properties unique to that object (and potentially sharable with specializations of that object, i.e., a child object shares or inherits many of the attributes and relations of the parent), and named relations to other objects.

The purpose of the ontology is to provide a uniform, text-based, intermediate representation of the knowledge types specific to a development effort. The intermediate representation provides a means of describing knowledge, at any level of granularity, without expert knowledge of specific technologies. The ontology is expandable to meet the needs of the growth of a particular project or technology. The anticipated evolution of the ontology is that it will begin with the identification of certain simple terms and some means of logically grouping those terms together (e.g., in the manner that WINDOWS™ file systems allows the definition of a folder hierarchy to organize files). As experience is gained in representing the knowledge, "complex" terms will emerge that act as a means of functionally grouping a number of simple objects together (e.g., a problem/resolution might consist of one or more events, the associated underlying failures, and one or more procedures).

The following are some examples of words which may be included in the ontology:

Alarm—an event that is issued when an abnormal condition is detected which cannot be resolved internally. Ideally it provides information useful in resolving the failure.

Application—a software environment designed to provide some business functionality.

Clear Event—an event that is issued to state that the condition reported by a previous event is no longer valid.

Client—hardware acting as a terminal node in a network. The use of this term in the ontology is based on an assumption that it is more useful to classify hardware based on its role, than on the increasingly ambiguous "mainframe/midrange/desktop" model.

Command—system-specific syntax that is entered into a computer to evoke a response.

As previously mentioned, the above is just a short list of words that can be used in the ontology. One skilled in the art would know that any number of words can be used to describe various types of technology.

The process described above can be implemented employing the system shown in FIG. 1. All of the specifications and knowledge assets created can be stored in the database 20 for access at future times. The database is organized so that these specifications and the knowledge assets are easily accessible. This organization entails establishing links between the documents which are created which share a common purpose. The database structure is meant to store descriptions of knowledge "types." In practice, these are object-type names (e.g., a "picture" type for representing graphical images), attribute-type names (e.g., a "file name" attribute type), and relation-type name (e.g., an "included in" relation type). In addition to describing types, the database also stores object instance information. Shown below are examples of tables incorporated into the database structure:

objectTypeTable

| objectTypeId | name | description |
|---|---|---|
| 1 | Picture | "graphical object reference" | propertyTypeTable

| propertyId | name | description | propertyType | contentType |
|---|---|---|---|---|
| 1 | "Included In" | "containment relationship" | relation | object |
| 2 | "Includes" | "containment relationship" | relation | object |
| 3 | "Filename" | "name of file" | attribute | short_text |
| 4 | "Directory Name" | "name of directory" | attribute | short_text |
| 5 | "Name" | "content name" | attribute | short_text |
| 6 | "Description" | "content description" | attribute | long_text | objectPropertiesTable

| objectTypeid | propertyId |
|---|---|
| 1 | 1 |
| 1 | 3 |
| 1 | 4 |
| 1 | 5 |
| 1 | 6 | objectInstanceTable

| objectInstanceId | objectTypeId | initiator | steward | implementor |
|---|---|---|---|---|
| 1 | 1 | | | | propertyInstanceTable

| objectInstanceId | propertyId | propertyValue |
|---|---|---|
| 1 | 3 | "FIDO1.GIF" |
| 1 | 4 | "F? \DATA\IMAGES\" |
| 1 | 5 | "FIDO1" |
| 1 | 6 | "image of project mascot" |

In the example shown, the objectType table describes the object type "picture" and assigns it a unique I.D. The property type table describes a set of properties, each with a unique I.D., that can be used in any number of objects. The object properties table links a specific object I.D. with the property I.D.'s used to describe the object. In this example, we have linked the "picture" object with five properties (in reality, there would probably be a significantly large number).

The object instance table, links the unique Object instance I.D. with the objectType I.D. Then, for that instance I.D. (which we would know to be the type "picture"), the assigned properties can be looked up in the property Instance table. In this case, the Object instance I.D. #1 (picture) has a file name of "Fido1.gif," a directory name of "f:\data\images," a name of "Fido1," and a description of "image of project mascot." This style of representation allows a user to create any number of object, relation and attribute types without the need to modify the underlying database structure.

Figure 3:
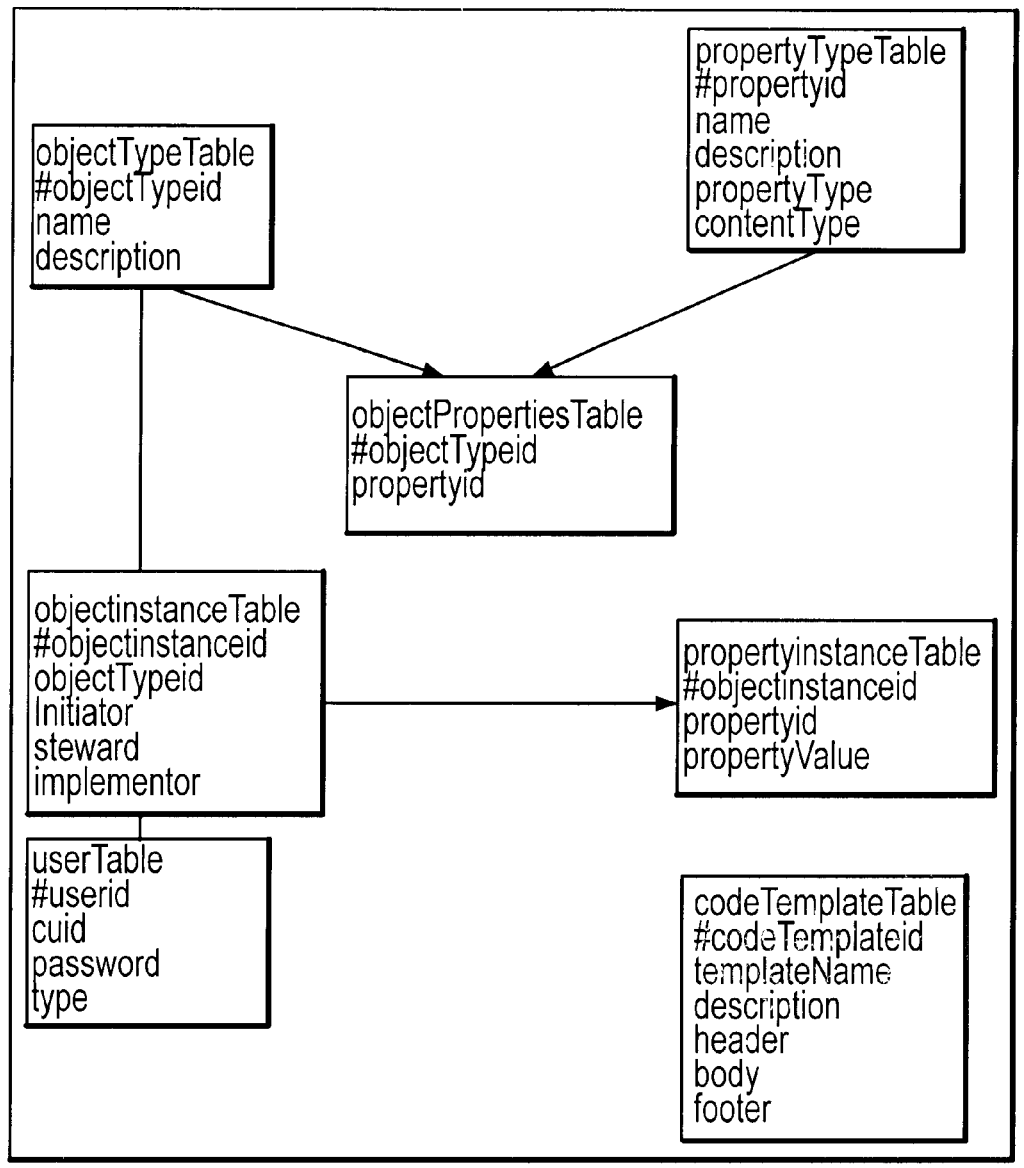
FIG. 3 discloses a graphical representation of the database structure.

FIG. 3 shows in detail the structural makeup of the database for items with established links. The following simplified example shows how tables would be utilized to describe the "picture" object type, with a relation "included," and the attributes "name," "description," "file name," and "directory." The example also shows the representation of an instance of the "picture" object type, named "Fido1." The userTable contains information a system user must use in order to access the database. This includes UserID and password.

The codeTemplate Table contains information which controls the format of the database.

Figure 4:
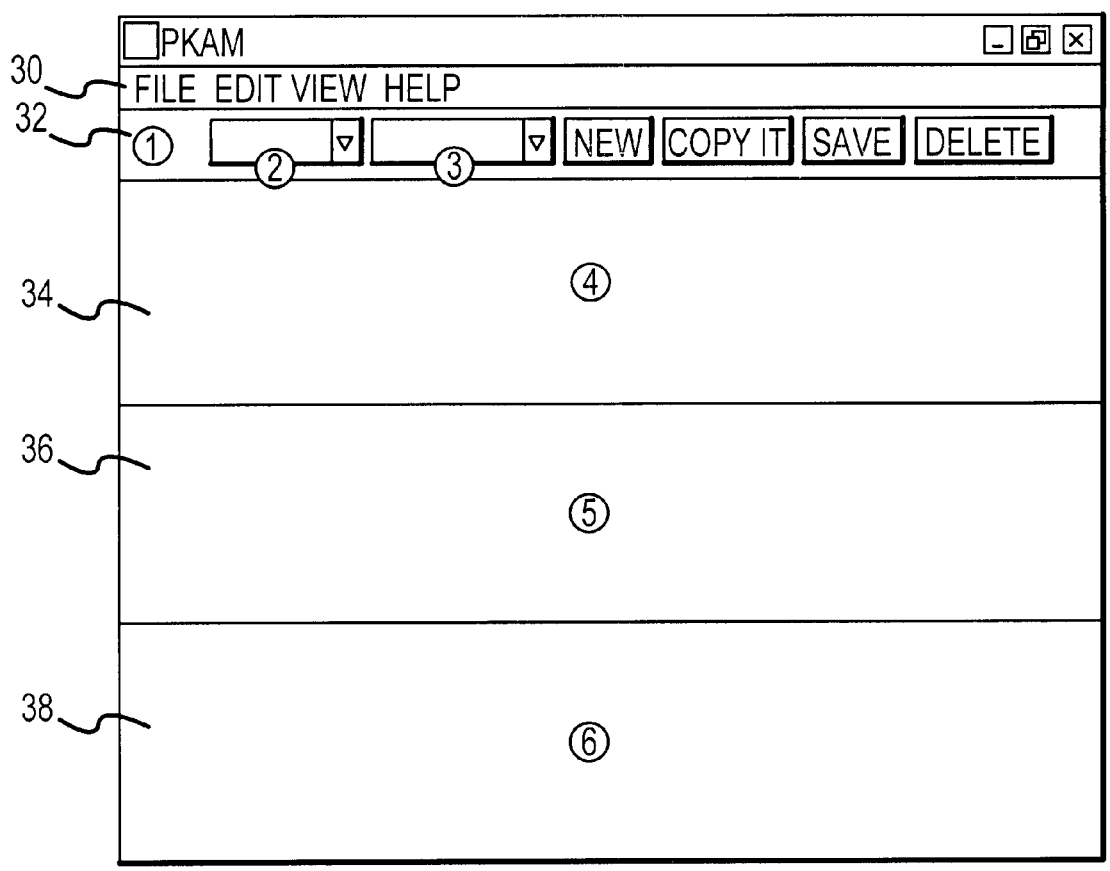
FIG. 4 discloses a screen display which a system user uses when entering or accessing knowledge stored in the database.

Disclosed in FIG. 4 is a screen display presented on the GUI 12 which provides for the input and retrieval of specifications and implemented solutions. The main window is composed of five distinct areas, the menu bar 30, the object bar 32, the status/implementation window 34, the relation window 36 and the attribute window 38. The menu bar 30 contains four submenus; file, edit, windows and help. The file menu contains commands to create a new knowledge base, open an existing knowledge base, save a knowledge base or close a knowledge base. It also contains a range of print commands, reports or generate code commands. The file menu also contains the "preferences" selection. Presently the main responsibility within preferences is to select a set of "valuation criteria" (e.g., number of customers impacted, quality of customer impact, impact support plan, and others listed in the original document), by which the knowledge object will be prioritized for implementation, and credit assigned to the initiator. In the edit window, standard editing commands are included such as cut, copy and paste. The later three are applied to any text highlighted by the mouse. Additional windows in the application are graphical browser, an object type display/editor, a property display/editor and a status display.

The object bar 32 controls the display within the three windows 34–38. The user selects one of the pre-defined objects using the selector, which has the effect of populating the object name selector with the instances of that object type that have been created. The user may use the buttons on the object bar to create a new object of the type selected, copy the object instance currently displayed to a new object instance of the same type, commit additions or changes for this object to the database, or delete the object. Use of the delete command may be limited only to those with the necessary authorization.

The status/implementation window 34 shows where the object is within the process for knowledge acquisition and management. Status information includes a status tag (created, initiated, specification completed, implementation planned, implementation complete, implementation accepted), the date the tag was assigned, the priority, and a text field describing the implementation plan (or providing a URL to a more complete plan). Objects of a complete status (i.e., the object has been implemented, accepted by the initiator and the steward, and no pending revisions) uses this area to show the date the implementation plan was completed.

The relation window 36 shows the links of the objects to other objects already defined. The system defines a "included in" relation, to show basic containment relationships (e.g., a documentation object "includes" one or more picture objects, each picture object has an "included in" relationship pointing back to the documentation object) as well as any other objects which reference that picture. While user-defined relations are possible, they must be defined in the relation editor, and specified as legal for the object type.

The attribute window 38 displays the property specific to that object type. The system defined attributes held by all objects include name, description, initiator, steward, implementor, and notes. While user-defined attributes are possible, they must be defined in the attribute editor and as specified as legal for the object type. As mentioned above, there are four additional windows available through the windows sub-menu of the menu bar. These windows are a graphical browser, an object-type display/editor, a property display/editor and a status display. The graphical browser shows a display of objects and name links. The object display/editor allows the stewards to create a new object type. The type consists of a name, a "parent" object and a description. The steward then works from a list of all attributes in relations to specified as subset that are legal for that object; all attributes in relations legal for the "parent" object are automatically made legal for the object.

The property-type display/editor shows a name, a description, and the property type (attribute or relation). For attributes, the steward selects a content type; for relations the content type is automatically set to object. The status display sorts and displays objects based on their status (e.g. "created", "initiated," etc.). Within each status, objects are sorted based on priority; within a priority, objects are grouped based on date/time of creation. This display has a number of purposes. The main purpose is to serve as a kind of message board, to allow those with roles within the process to discover at a glance what objects they are currently responsible for, before moving to the next phase of the process. The board also offers a high level of visibility into the process as a whole, allowing system operators to see where any process bottlenecks are occurring. In addition, it allows users to see what knowledge objects are currently working their way through the system.

Figure 5A:
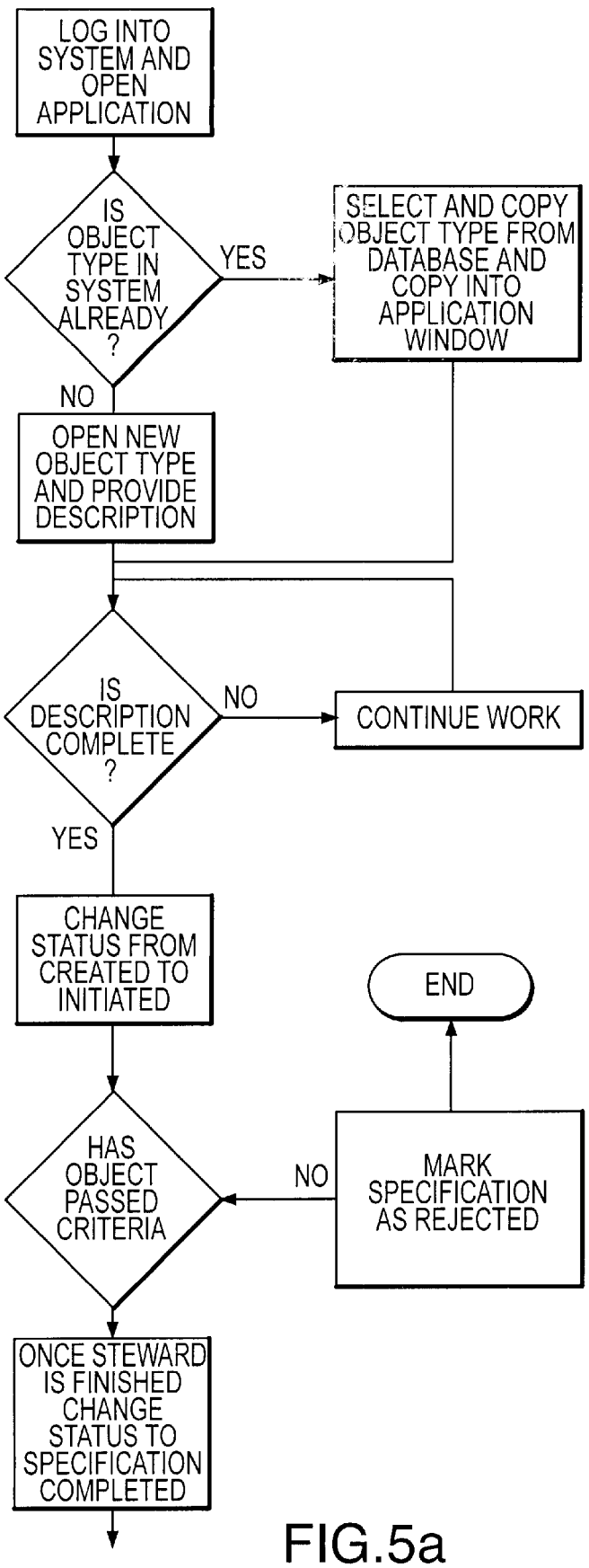
FIGS. 5a and b disclose a flow chart which describes the steps performed in an example of the process.
Figure 5B:
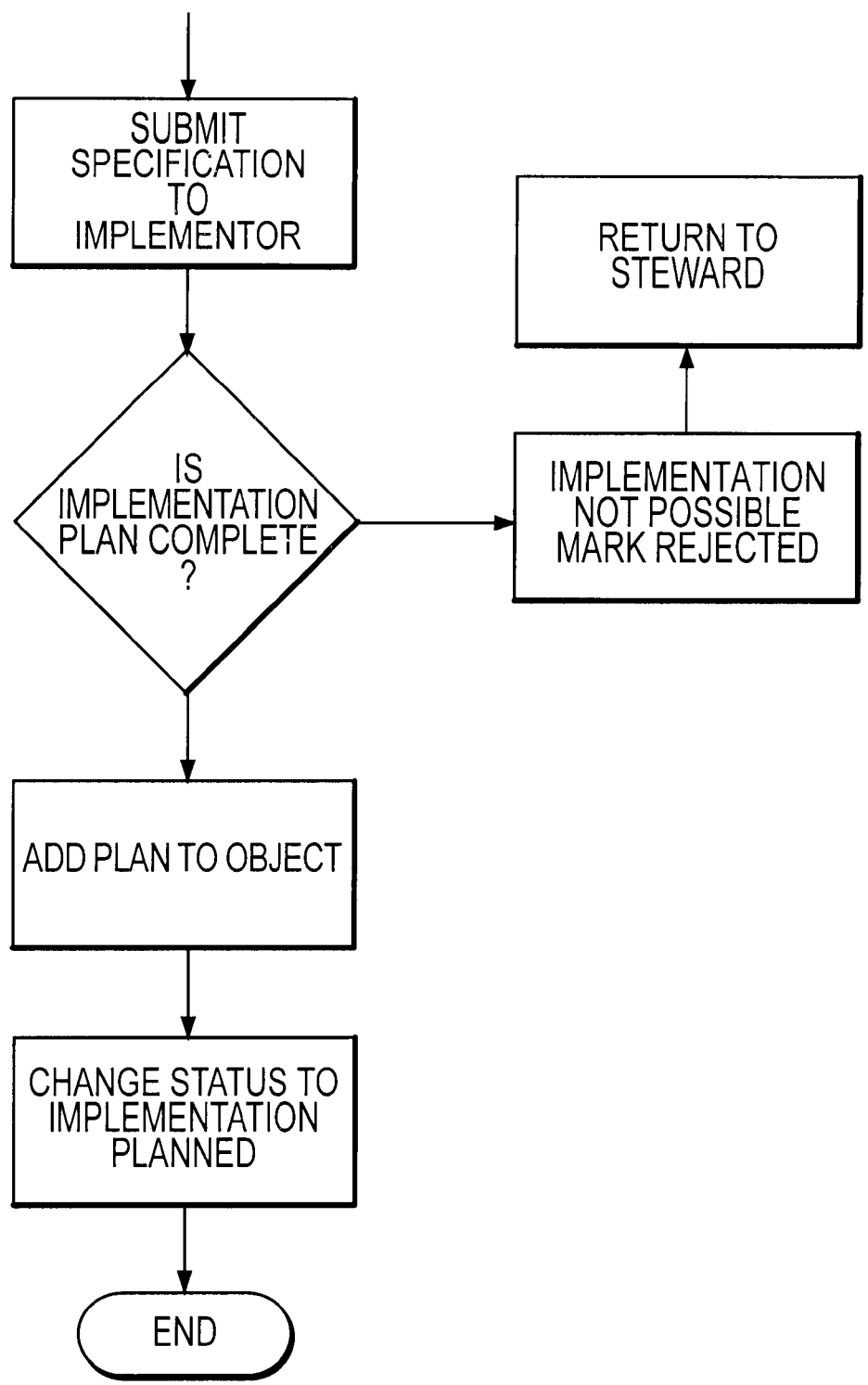

FIGS. 5a and b discloses a flow chart which describes an example of the operation of the system. In order to first generate a specification, the initiator logs into the application, opens the appropriate knowledge base, selects the object type to create, and presses the "new" button on the object bar. An empty template appears which the user fills out. Alternatively, if the object to be created bears a resemblance to an object already in the database, the user selects the object type and the object instance name. The user then presses the "copy to" button which prompts for the new name and creates a new object with the appropriate content copied over. When the user has finished specifying the object (which may take place over several sessions), they change the status of the object from "created" to "initiated."

The act of changing status from "created" to "initiated" submits the specification to the steward. Depending on user preferences, notification may take place either by an automatically generated e-mail triggered by the status change, or by the automatic addition of the object to the report which lists the objects in the system sorted by status. A steward uses the main screen and graphical browser window to examine the knowledge base and ensure that the knowledge is unique, within the project scope and useful. If so, the steward adds any additional information necessary and changes the status from "initiated" to "specification completed." The steward is also responsible for validating the valuation criteria values assigned for the knowledge since these factors are responsible for establishing implementation priority. If the object fails based on the criteria listed above, the status may be changed to "rejected," and the steward adds an explanation to the "notes" property. At a later point the steward may change the status from "rejected" back to "initiated" or "specification completed" if circumstances warrant.

Changing the status from "initiated" to "specification completed" submits the specification to the implementor. The implementor uses the specification in the main screen, and ensures that the specification is complete, and adds an implementation plan to the object. When the plan is complete, the implementor changes the status from "specification completed" to "implementation planned." This change in status should trigger a "hold" on the object, to ensure that the initiator and the steward have an opportunity to review the plan. Notification is handled as described in the steps above. The length of the hold is set on a project wide basis by the steward in the "preferences" under the file submenu on the menu bar. If the implementor is unable to generate an implementation plan from the specification, they may change the status to "rejected." At this point it would be the responsibility of the steward to address the concerns of the implementor, and at some point, change the status back to "specification completed." The implementor uses the formal presentation of the object captured in the application as the basis for implementing and testing the object knowledge within a specific, appropriate technology. The implementor changes the status of the object from "implementation planned" to "implementation completed." Notification is handled as in the steps above.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for managing a plurality of knowledge assets on a computer based database, comprising the steps of:

presenting a first interface configured to receive a description of a knowledge asset;

receiving the description entered through the first interface and storing said description on a computer readable database which is accessible by a plurality of users;

assigning a status to said description;

automatically providing notification of said status to at least one of the plurality of users;

presenting, upon detection of access to said description by at least one of said users, said description on a second interface specially configured for receiving the at least one modification;

detecting entry of the at least one modification to the description and incorporating the at least one modification in said description and storing said description on said database;

providing access to a shared vocabulary, wherein the shared vocabulary includes common terms and phases employable in the description and the at least one implementation plan; and based on the entry of the at least one modification in the description, further changing said status of said description.

2. The method claimed in claim 1, further comprising the step of:

searching said database to determine if said description is a description of a new knowledge asset.

3. The method claimed in claim 1, further comprising the steps of:

displaying said description on a third interface configured to receive at least one implementation plan;

upon detection of receive of at least one implementation plan, linking said implementation plan to said description and storing said link and said implementation plan on said database related to the description; and further updating said status of said description to indicate generation of said implementation plan.

4. The method claimed in claim 3, further comprising the steps of:

providing the automated notification of said further change of the status to at least one of said plurality of users; and presenting said implementation plan on a fourth interface configured to display said implementation plan to at least one of said plurality of users.

5. The system of claim 1 wherein the shared vocabulary further comprises a shared ontology which is accessible in order to include the common terms and phrases.

6. A system to manage a plurality of knowledge assets, comprising:

a memory storage apparatus for storing a plurality of alphanumeric documents;

a data processing apparatus connectable to said memory storage apparatus and configured to present a first interface on a display apparatus, wherein the first interface is configured to a receive at least one description for at the least one knowledge assets, where said description is storable in the memory storage apparatus, said data processing apparatus is further configured to assign a status to the knowledge asset and provide automated notification of the status to at least one system user;

said data processing apparatus further configured to present a second interface on the display apparatus employable to receive a at least one modification for the at least one description, update the status of the at least one knowledge asset, and provide a further automated notification to the at least one system user, and a third display configured to receive at least one implementation plan, and said processing apparatus generates a link between said at least one implementation plan and said at least one description; and said memory apparatus contains a shared vocabulary which is accessible in order to include common terms and phases in at least one of: the at least one description and the at least one implementation plan.

7. The system claimed in claim 6, wherein said data processing apparatus is further configured to automatically incorporate the at least one to modification in said at least one description.

8. The system claimed in claim 6, wherein said memory storage apparatus is further configured to store a link between said description and said implementation plan when stored in the memory storage apparatus.

9. The system claimed in claim 8, wherein said data processing apparatus is further configured to display said at least one the implementation plan an a fourth user interface.

10. The system claimed in claim 6, wherein said memory apparatus contains a shared ontology which is accessible in order to include common terms and phases.

11. The system claimed in claim 6, wherein said at least one description includes object-type names.

12. The system claimed in claim 6, wherein said at least one description includes attribute-type names.

13. The system claimed in claim 12, wherein said at least one description includes relation-type names.

14. The system claimed in claim 6, wherein said memory storage apparatus stores object instance information.

* * * * *

UNITED STATES PATENT AND TRADEMARK OFFICE
CERTIFICATE OF CORRECTION

PATENT NO. : 6,370,542 B1
DATED : April 9, 2002
INVENTOR(S) : Kenyon

It is certified that error appears in the above-identified patent and that said Letters Patent is hereby corrected as shown below:

Title page,
Item [54], after "KNOWLEDGE", insert -- ASSET --;

Column 11,
Line 13, delete the word "phases", and insert therefor -- phrases --;
Line 27, delete the word "receive", and insert therefor -- receipt --;

Column 12,
Line 35, delete the word "an", and insert therefor -- on --;
Line 38, delete the word "phases", and insert therefor -- phrases --.

Signed and Sealed this

Fifteenth Day of April, 2003

JAMES E. ROGAN
*Director of the United States Patent and Trademark Office*